United States Patent [19]

Kaufmann

[11] 4,242,388
[45] Dec. 30, 1980

[54] SEALING CEMENT USEFUL FOR PRODUCING LIQUID CRYSTAL DISPLAY CELLS

[75] Inventor: Meinolph Kaufmann, Fislisbach, Switzerland

[73] Assignee: BBC Brown Boveri & Company Limited, Baden, Switzerland

[21] Appl. No.: 965,046

[22] Filed: Nov. 30, 1978

[30] Foreign Application Priority Data

Dec. 20, 1977 [CH] Switzerland ............... 15734/77

[51] Int. Cl.³ ............................................. C09K 3/34
[52] U.S. Cl. ...................................... 428/35; 156/99; 156/325; 428/1; 428/72; 428/203; 428/204; 428/206; 428/208; 428/325; 428/329
[58] Field of Search ............... 428/1, 72, 203, 204, 428/206, 208, 325, 329, 35; 350/160 LC; 156/99, 103, 325

[56] References Cited

U.S. PATENT DOCUMENTS

| | | | |
|---|---|---|---|
| 3,919,452 | 11/1975 | Ettre | 428/1 |
| 4,132,464 | 1/1979 | Maeno | 428/1 |

*Primary Examiner*—Marion McCamish
*Attorney, Agent, or Firm*—Oblon, Fisher, Spivak, McClelland & Maier

[57] ABSTRACT

A sealing cement which is useful for bonding together mutually aligned glass plates of a liquid crystal display cell, the improvement which comprises incorporating into said cement a particulate filler of variably sized particles, wherein the shortest distance between parallel tangential planes of each particle is substantially the same for a substantial majority of said particles and the shortest distance between parallel tangential planes for the remainder of said particles is less than said shortest distance between parallel tangential planes of said substantial majority of particles, whereby the spacing between said glass plates being bonded is determined by said shortest distance of said substantial majority of particles.

9 Claims, No Drawings

SEALING CEMENT USEFUL FOR PRODUCING LIQUID CRYSTAL DISPLAY CELLS

BACKGROUND OF THE INVENTION

1. Field of the Invention

The present invention relates to a sealing cement, in particular a plastic-based cement which is useful for sealing mutually aligned glass plates of a liquid crystal display cell.

2. Description of the Prior Art

In the production of liquid crystal display cells, mutually aligned glass plates are sealed together with a space left between them for containing the liquid crystal material. A suitable spacing for such cells is usually from 7 to 10 μm. Such cells are ordinarily produced by silk-screening a gasket-shaped layer of the sealing compound around the periphery of one of the cell plates. It is common practice to pre-treat the glass plates with a surface-active adhesion promoter, such as an organosilane compound, in order to improve the adhesion between the sealing cement and the glass surface.

The sealing cements employed for this purpose have previously been ultraviolet curing cements and especially high-temperature curing cements. These later cements are characterized by long pot times at room temperature, so that they remain workable for many hours, and even up to several days. To rapidly cure such a cement, temperatures of from 120° to 180° C. are required, depending upon the particular type of cement employed. At these high temperatures, however, most cements become very thin and, through capillary action in the narrow space between the cell plates, are apt to flow into and cover the display area of the cell. Thickening agents and thixotropic agents are of little help to prevent such flow because most such conventional agents lose their effectiveness at temperatures over 120° C. Such cements must therefore be cured at lower temperatures which can require several hours, if they can be cured at all.

A need therefore continues to exist for a sealing cement which can be used to form a gasket-shaped layer of uniform desired thickness between the plates of a liquid crystal display cell, and which can be cured at higher temperatures without flowing into the display area of the cell.

SUMMARY OF THE INVENTION

Accordingly, one object of this invention is to provide a sealing cement which is useful for bonding together mutually aligned glass plates of a liquid crystal display cell.

Another object of the invention is to provide a sealing cement which can be formed into a gasket-shaped layer of uniform desired thickness.

A further object of the invention is to provide a sealing cement which can be cured at higher temperatures and which will not flow into the display areas of the cell during the curing procedure.

Yet another object of the invention is to provide a method for bonding together mutually aligned glass plates of a liquid crystal display cell so as to produce a gasket-shaped layer of uniform thickness and desired spacing.

Briefly, these objects and other objects of the invention as hereinafter will become more readily apparent can be attained by providing in a sealing cement which is useful for bonding together mutually aligned glass plates of a liquid crystal display cell, the improvement which comprises incorporating into said cement a particulate filler of variably sized particles, wherein the shortest distance between parallel tangential planes of each particle is substantially the same for a substantial majority of said particles and the shortest distance between parallel tangential planes for the remainder of said particles is less than said shortest distance between parallel tangential planes of said substantial majority of particles, whereby the spacing between said glass plates being bonded is determined by said shortest distance of said substantial majority of particles.

DETAILED DESCRIPTION OF THE PREFERRED EMBODIMENTS

The sealing cement of the present invention avoids the disadvantages of the cements commonly in use today. The cement is simple to prepare from readily available materials. Processing steps are also simple, since the inherent properties of the cement produce the remarkable and desirable results which are achieved by the process of the invention. Curing times are short, and there is essentially no flow of sealing cement into the display area of the cells, despite the use of higher temperatures for curing. The sealing cements of the invention are compatible with conventional additives and adhesion promoters, with the result that the spacer seals achieved using the cement are tight, coherent and uniformly thick.

Various cements may be used to prepare the sealing compound of the invention. It is preferable to use plastic-based cements. Epoxy resins such as those used for fiberglass laminates are particularly suitable, an example being Ciba-epoxy 556. These resins are normally used with conventional hardening and accelerating additives which are well-known in the art.

In order to achieve a sealing cement with the desired properties, enough particulate filler must be added to the cement so that the particles can be characterized as "closely packed". In this instance, the capillary forces acting on the cement between the tightly packed particles will be much stronger than the capillary forces between the glass plates. The cement will thus tend to remain in the region where it was deposited and will not flow into the display area of the liquid crystal cell. The optimum proportion of the particulate filler is easily determined by experiment. The shape and size of the filler particles are chosen so that the thickness of the deposited layer of the cured sealing cement corresponds to the desired separation of the mutually aligned glass plates of the cell.

Suitable particulate fillers include any powdered material which is compatible with the cement and which does not interfere wih the blending, curing or sealing process, and which is chemically stable. The filler must have a substantial majority of particles of such size and shape that the shortest distance between parallel tangential planes is substantially the same. The remaining particles must have a size and shape such that the shortest distance between parallel tangential planes is less than the shortest distance between parallel tangential planes for the substantial majority of particles. Fillers having particles where such shortest distance between parallel tangential planes for the majority of particles is from 7 to 10 μm are preferable. Especially preferred particulate fillers are glass beads and lens-shaped alumina granules. Glass beads having diameters of between 7 and 10 μm are readily available on the market, and the diameter of the substantial majority of such beads will determine the separation of the glass plates.

For particles having irregular shapes, the desired cell plate separation is determined by the minimum distance between parallel tangential planes in contact with the largest particles, which must make up the substantial majority of the filler.

Because the filler particles are normally denser than the cement component, the particles in the sealing cement will tend to settle downwardly to the substrate after deposition and will tend to assume a final position where the planes tangential to the particle in the longest dimension are parallel to the glass plates. Elongated particles, for example, would gradually sink down in a horizontal position. The planes tangential to such particles in the longest dimension would also be horizontal, and the shortest distance between such tangential planes would be vertical, and perpendicular to the glass plates.

Having generally described this invention, a further understanding can be obtained by reference to certain specific examples which are provided herein for purposes of illustration only and are not intended to be limiting unless otherwise specified.

EXAMPLE 1

Sealing cements according to the invention were prepared using glass beads as an additive and an epoxy resin cement. Optimum results were obtained when the glass beads comprise from 30% to 70% of the weight of the sealing cement. Preferably the beads should have diameters to give the required cell plate separation of 7–10 μm. The sealing cements were deposited by a silk-screen process, and the plates were joined and cured. The sealing cements had curing times of about 15 minutes at a temperature of 160° C. There were no longer any flow problems at this temperature, even when silane adhesion promoters were employed.

EXAMPLE 2

Sealing cements were prepared using lens-shaped Al$_2$O$_3$ granules, such as are commercially available under the trade name of "Microgrit WCA 9 μm", and an epoxy resin cement. Here it is the shortest dimension of the largest granules that determines the separation of the glass plates. A substantial majority of the granules must be of this size in order to obtain a uniformly thick layer. Preferably, a substantial majority of the granules should have a shortest dimension to give a cell plate separation of 7–10 μm. Optimum results were obtained using from 50% to 80% by weight of the alumina granules in the sealing cement. Curing times of about 10 minutes at 180° C. were observed.

In both of the above Examples, the cells obtained had uniformly thick separations and the seals were tight and coherent.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A method of bonding together the mutually aligned glass plates of a liquid crystal display cell, which comprises
   applying a gasket-shaped layer of a sealing cement between said glass plates,
   joining said plates, and
   curing said layer of sealing cement, thereby producing a layer of uniform thickness which determines the separation of said glass plates;
   wherein said sealing cement comprises a particulate filler of variably sized particles in a quantity sufficient to closely pack said filler particles when said glass plates are mutually aligned and bonded together;
   wherein the shortest distance between parallel tangential planes of each particle is substantially the same for a substantial majority of said particles and the shortest distance between parallel tangential planes for the remainder of said particles is less than said shortest distance between parallel tangential planes of said substantial majority of particles, whereby the spacing between said glass plates being bonded is determined by said shortest distance of said substantial majority of particles.

2. The method of claim 1, wherein said layer is applied by silk-screening.

3. The method of claim 1, wherein said curing is effected at a temperature of from 120° to 180° C.

4. The method of claim 1 wherein said particulate filler comprises glass beads, and wherein said glass beads make up from 30 to 70% of the weight of said sealing cement.

5. The method of claim 1 wherein said particulate filler comprises lens-shaped Al$_2$O$_3$ granules, and wherein said granules make up from 50% to 80% of the weight of said sealing cement.

6. The method of claim 1 wherein said shortest distance between parallel tangential planes for said substantial majority of said particles is from 7 to 10 μm.

7. A liquid crystal cell comprising mutually aligned glass plates bonded by the method any of claims 1, 4, 5 or 6.

8. The method of claim 1, wherein said cement is a plastic-based cement.

9. The method of claim 1, wherein said cement is an epoxy resin cement.

* * * * *